though only one embodiment of the invention has been depicted and described, it will be apparent that

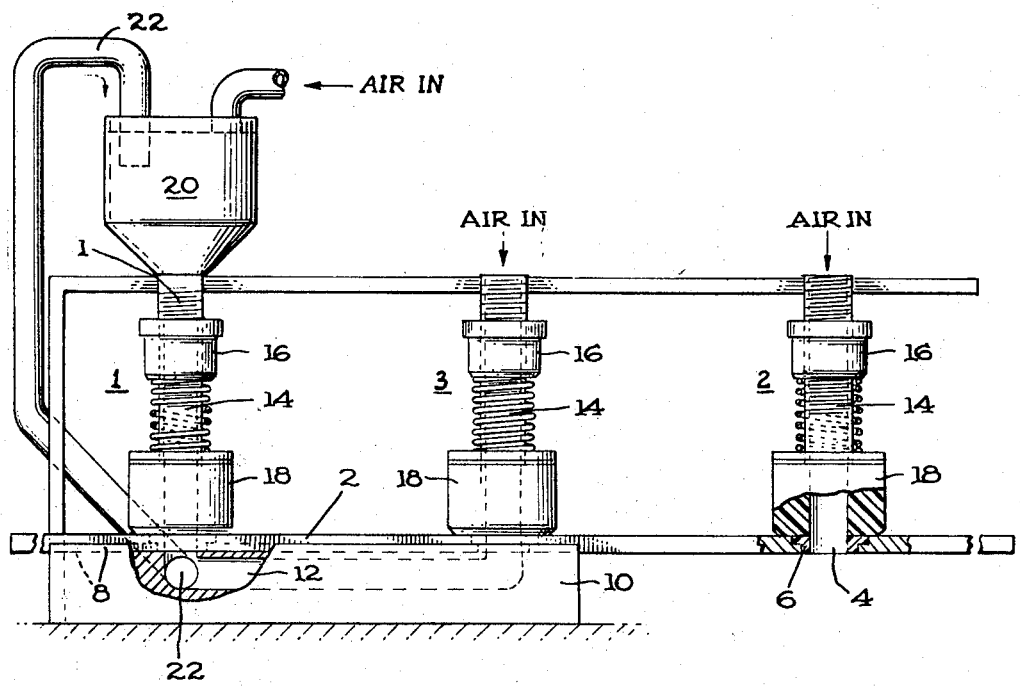

3,478,925
VISCOUS DISPENSING SYSTEM
Larry E. Austin, Burlington, and Francis R. Titcomb, Middlebury, Vt., assignors to Simmonds Precision Products, Inc., Tarrytown, N.Y., a corporation of New York
Filed Nov. 13, 1967, Ser. No. 682,163
Int. Cl. B67b 7/00; B67d 1/08, 5/54
U.S. Cl. 222—1                                     4 Claims

ABSTRACT OF THE DISCLOSURE

A viscous dispenser having a slidably mounted carrier member with a cavity therein adapted to be positioned at a first station wherein the cavity is filled, with the excess viscous material being discharged into an underlying channel. The carrier is then positioned under a second station for discharging the charge in the cavity by means of air pressure, whereupon the carrier is positioned under a third station wherein the cavity is cleaned of any excess charge, this excess being transmitted to the underlying channel in which the excess from the loading operation is contained and thereupon, by means of air pressure, the total excess of viscous material is transmitted by means of a return conduit back to the loading station.

---

This invention relates to viscous material dispensing and more particularly to such a device which can automatically dispense viscous material at a predetermined frequency and in which the size and shape of the dispensed material can be controlled.

Heretofore, dispensers for viscous material have exhibited a number of difficulties. For example, there is the problem of transferring the material from the dispenser to a workpiece without altering the desired shape and volume of the dispensed material. Also, many viscous materials are more cohesive than adhesive and thus raise the problem of adherence of the dispensed material to a firm surface. In addition, it has been found with conventional devices that a charge of viscous material in the dispenser is never completely discharged and a portion of the material will remain owing to its viscous nature. This invention provides a dispensing or charging device for viscous material in which the foregoing difficulties are avoided.

Accordingly, it is an object of this invention to provide a viscous material dispenser which operates automatically at a predetermined frequency and which can control the size and shape of the charge.

It is another object of this invention to provide a viscous material dispenser which is equipped with a cavity for receiving a given amount of charge of viscous material and which is subsequently completely emptied of the charge.

It is yet another object of this invention to provide a viscous material dispenser in which the charging thereof is done without waste or loss of any of the viscous material.

According to one aspect embodying the principles of this invention, there is provided a slide member having a cavity from which the charge is dispensed. The slide member is adapted to assume three spaced positions, the first being a loading position wherein the cavity is filled with the charge material, the second position wherein the cavity is positioned under an air pressure source in which a time pressure control causes the charge to be ejected from the cavity onto a suitable workpiece, and a third position wherein the cavity is cleaned by air pressure forcing any excess charge material through a return conduit back to the supply hopper.

Other objects and advantages will become apparent from a following study of the specification and drawing in which there is shown in the drawing a side elevational view of the dispensing system according to the principles of this invention.

Referring now to the drawing, there is shown a planar carrier slide member 2 having a cavity 4 defined therein by a plastic insert 6 of Teflon or the like. The slide 2 is supported in a track or guide slot 8 located on the upper surface of a base support member 10. Extending through the base 10 is a channel 12 having outlets on the track 8 which are in line with the cavity 4 on the slide 2. Positioned above the slide 2 and in line with the cavity and the outlets of the channel 12 are three air pressure stations 1, 2, and 3. Each of the stations is provided with an air pressure supply tube 14 and adjustably mounted on each of the tubes 14 is a bushing member 16. For this purpose the member 16 may be screw-threaded on the supply tubes 14 or there may conveniently be provided a locking screw (not shown) extending through the side of the bushing 16 and engaging the tube 14. Directly underneath each of the members 16 is a coil spring surrounding the tube 14 and bearing against the top of a cylindrical seal member 18 composed of Teflon or the like. The tube 14 fits in a suitably recessed portion of the axial bore of the seal 18 and in this manner the spring biases the seal against the slide 2. The tube 14 located in station 1 is connected at its upper end to a supply hopper 20 which is filled with a suitable viscous material contained therein. Further, a return conduit 22 connects the conduit or channel 12, as shown, to the supply hopper 20.

The operation of the system according to this invention is as follows: When the slide member 2 is in a position such that the cavity 4 is located at station 1, air pressure is applied to the viscous material in the supply hopper 20 forcing the material through the tube 14 into the cavity 4. The pressure is maintained to allow overfilling the cavity with the excess going into the channel 12 by means of one of its outlets on the track 8 located directly under station 1. The slide 2 is then shifted forward to position the cavity 4 at station 2, whereupon air pressure is again applied to the tube 14 located at station 2. The applied pressure will eject the charge in the cavity onto a suitable workpiece positioned therebelow. The shape of the dispensed charge may be varied by length of time and pressure of the air blast through tube 14. Further, the charge will assume approximately the shape of the cavity, that is, square, circular, rectangular, or any variation thereof. After the charge has been dispensed, the slide 2 is then adapted to be retracted for positioning the cavity at station 3. Again, air pressure is applied through the tube 14 located at station 3 for cleaning out the cavity forcing any residue or excess material from the cavity into channel 12 by means of the outlet located on track 8 directly beneath station 3. This excess material together with the excess material already collected in channel 12 from the loading operation at station 1 will now be transferred under the air pressure from station 3 through the return conduit 22 back into the supply hopper 20. Once this step is completed, the entire operation is then repeated beginning at station 1.

It should be understood that the slide 2 is of sufficient length so as to be at all times in contact with the three seal members 18. Further, the slide member 2 may be operated automatically by suitable reciprocating drive means (not shown) or it may be operated manually.

The invention thus provides a dispensing system which is economical and clean to operate in that excess viscous material left in the cavity of the slide carrier 2 is automatically cleaned out and returned ot the loading hopper without any loss of charge material.

Although only one embodiment of the invention has been depicted and described, it will be apparent that

What is claimed is:

1. In a viscous material dispenser, the combination comprising a slidably mounted carrier means for a given quantity of said viscous material, a supply at a first station engaging said carrier means for supplying said quantity of viscous material thereto, a means at second station engaging said carrier means for ejecting said quantity of viscous material except for any excess, a means at a third station engaging said carrier means for removing said excess viscous material from said carrier means, and transfer means connecting said third station to said first station for collecting and returning said excess material to said supply.

2. In a viscous material dispenser, the combination comprising a slidably mounted carrier means for said viscous material, a supply at a first station engaging said carrier means for supplying a given quantity of viscous material to said carrier means, a means at a second station engaging said carrier means for ejecting said given quantity of viscous material except for any excess, a means at a third station engaging said carrier means for removing said excess viscous material therefrom, air pressure means connected to each of said stations, and a transfer means connecting said third station to said first station and said supply for collecting and returning said excess material to said supply.

3. In a viscous material dispenser, the combination comprising a slidably mounted carrier means having a cavity therein for receiving a given quantity of said viscous material, a supply at a first station engaging said carrier for supplying a charge of said viscous material to and an excess beyond said cavity, means at a second station engaging said carrier for ejecting said charge from said cavity except for any excess, means at a third station engaging said carrier for cleaning said cavity, air pressure means connected to said stations, a first transfer means connecting said first station and said third station for collecting said excess viscous material during respective supplying and cleaning of said cavity, and a second transfer means connecting said first transfer means to said supply for returning said excess material thereto.

4. A method for dispensing viscous material comprising the steps of filling with and passing an excess of said viscous material through a cavity from a supply hopper by means of air pressure, collecting said excess material, discharging the charge of said cavity by means of air pressure except for a residue, cleaning out said residue from the cavity by means of air pressure, collecting said residue material from said cleaning operation, and transmitting said collected excess and residue material to said supply hopper.

References Cited

UNITED STATES PATENTS

| | | | |
|---|---|---|---|
| 2,680,683 | 5/1954 | Obenshain | 222—194 X |
| 3,227,312 | 1/1966 | Solvik et al. | 222—194 X |
| 3,291,347 | 12/1966 | Blades | 222—194 X |

ROBERT B. REEVES, Primary Examiner

H. S. LANE, Assistant Examiner

U.S. Cl. X.R.

222—148, 194, 318